(12) United States Patent
Wu et al.

(10) Patent No.: US 11,416,462 B2
(45) Date of Patent: Aug. 16, 2022

(54) TECHNIQUES FOR EFFICIENT DATA DEDUPLICATION

(71) Applicant: EMC IP Holding Company LLC, Hopkinton, MA (US)

(72) Inventors: Peng Wu, Westborough, MA (US); Bin Dai, Hopkinton, MA (US); Rong Yu, West Roxbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 212 days.

(21) Appl. No.: 16/927,257

(22) Filed: Jul. 13, 2020

(65) Prior Publication Data
US 2022/0012218 A1    Jan. 13, 2022

(51) Int. Cl.
| | |
|---|---|
| *G06F 16/215* | (2019.01) |
| *G06F 13/20* | (2006.01) |
| *G06F 16/245* | (2019.01) |
| *G06F 16/22* | (2019.01) |
| *G06F 16/174* | (2019.01) |

(52) U.S. Cl.
CPC .......... *G06F 16/215* (2019.01); *G06F 13/20* (2013.01); *G06F 16/174* (2019.01); *G06F 16/2255* (2019.01); *G06F 16/245* (2019.01)

(58) Field of Classification Search
CPC .. G06F 16/215; G06F 16/245; G06F 16/2255; G06F 13/20; G06F 16/174; G06F 16/1748; G06F 3/0641
See application file for complete search history.

(56) References Cited

U.S. PATENT DOCUMENTS

| | | | |
|---|---|---|---|
| 7,949,637 B1 | 5/2011 | Burke | |
| 8,065,277 B1* | 11/2011 | Gardner | ................ G06F 16/907 707/673 |
| 9,152,349 B2 | 10/2015 | Yochai | |
| 2011/0178996 A1* | 7/2011 | Pendlebury | ......... G06F 11/1453 707/E17.005 |
| 2012/0017060 A1* | 1/2012 | Kapanipathi | ......... G06F 3/0608 711/E12.001 |
| 2014/0195545 A1* | 7/2014 | Anand | ................ H04L 45/7453 707/747 |
| 2017/0220295 A1* | 8/2017 | Khan | ..................... G06F 3/0608 |
| 2018/0060367 A1* | 3/2018 | Ioannou | ............. G06F 16/2272 |

(Continued)

*Primary Examiner* — Alicia M Willoughby
(74) *Attorney, Agent, or Firm* — Muirhead and Saturnelli, LLC

(57) ABSTRACT

Data deduplication techniques may use a fingerprint hash table and a backend location hash table in connection with performing operations including fingerprint insertion, fingerprint deletion and fingerprint lookup. Processing I/O operations may include: receiving a write operation that writes data to a target logical address; determining a fingerprint for the data; querying the fingerprint hash table using the fingerprint to determine a matching entry of the fingerprint hash table for the fingerprint; and responsive to determining that the fingerprint hash table does not have the matching entry that matches the fingerprint, performing processing including: inserting a first entry in the fingerprint hash table, wherein the first entry includes the fingerprint for the data and identifies a storage location at which the data is stored; and inserting a second entry in a backend location hash table, wherein the second entry references the first entry.

17 Claims, 10 Drawing Sheets

(56) References Cited

U.S. PATENT DOCUMENTS

| | | | |
|---|---|---|---|
| 2018/0239553 A1* | 8/2018 | Lan | G06F 3/0641 |
| 2018/0260324 A1* | 9/2018 | Marathe | G06F 12/0804 |
| 2019/0102288 A1* | 4/2019 | Jin | G06F 3/0647 |
| 2020/0301593 A1* | 9/2020 | Vaithianathan | G06F 3/0673 |
| 2021/0133177 A1* | 5/2021 | Goswami | G06F 16/2272 |

* cited by examiner

TECHNIQUES FOR EFFICIENT DATA DEDUPLICATION

BACKGROUND

Technical Field

This application generally relates to data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for processing I/O operations comprising: receiving a write operation that writes first data to a target logical address; determining a first fingerprint for the first data; querying a fingerprint hash table using the first fingerprint to determine a first matching entry of the fingerprint hash table for the first fingerprint; and responsive to determining that the fingerprint hash table does not have the first matching entry that matches the first fingerprint, performing first processing including: inserting a first entry in the fingerprint hash table, wherein the first entry includes the first fingerprint for the first data and identifies a first storage location at which the first data is stored; and inserting a second entry in a backend location hash table, wherein the second entry references the first entry.

In at least one embodiment, Second processing may be performed that deletes the first entry from the fingerprint hash table. The second processing may include: receiving the first storage location; determining a first hash value for the first storage location; mapping the first hash value to a corresponding index of the backend location hash table; querying the backend location hash table to determine a second matching entry of the backend location hash table, wherein the second matching entry is associated with the corresponding index and has an associated backend location matching the first storage location, wherein said querying returns the second entry in the backend location hash table as the second matching entry; and deleting the first entry of the fingerprint hash table using the second entry.

In at least one embodiment, the fingerprint hash table may be distributed among a plurality of components, wherein the fingerprint hash table may include a plurality of portions of hash table entries, and wherein each of the plurality of components may manage a different one of the plurality of portions of the hash table entries. The first entry of the fingerprint hash table may be included a first of the plurality of portions of hash table entries, wherein the first portion is managed by a first of the plurality of components. Deleting the first entry may include: referencing the first entry using the second entry; obtaining the first fingerprint from the first entry that is referenced using the second entry; determining, in accordance with the first fingerprint, that the first component manages the first entry including the first fingerprint; and communicating with the first component that manages the first entry to delete the first entry from the first portion of hash table entries.

In at least one embodiment after receiving the first write operation and performing the first processing, the method may include: receiving a second write operation that writes second data to the target logical address, wherein the second data of the write operation overwrites the first data currently stored at the target logical address, and wherein the second processing that deletes the first entry from the fingerprint hash table is included in overwrite processing performed responsive to receiving the second write operation that writes overwrites the first data currently stored at the target logical address. The target logical address may denote a first logical address on a logical device that includes a plurality of logical addresses. The plurality of logical addresses may include the first logical address, and the method may include: performing processing to delete the logical device, and wherein the second processing that deletes the first entry from the fingerprint hash table is included in the processing that deletes the logical device.

In at least one embodiment, querying the fingerprint hash table using the first fingerprint to determine the first matching entry of the fingerprint hash table for the first fingerprint may further include: comparing the first fingerprint to an associated fingerprint of one entry of the fingerprint hash table; determining whether the first fingerprint and the associated fingerprint match; and responsive to determining the associated fingerprint matches the first fingerprint, determining that the corresponding entry is the first matching entry and that the first data is a duplicate of existing data used to generate the associated fingerprint. The second entry may include an address of the first entry. The first storage location may identify a backend location on physical storage at which the first data is stored.

In at least one embodiment, processing may include: performing deduplication processing, and wherein said deduplication processing includes performing said determining, said querying, and said first processing. Processing may include: storing the first data in a cache; and destaging the first data from the cache to physical storage, said destaging includes performing said deduplication processing. The method may be performed in a data storage system, wherein the write operation may be received at the data storage system from a host that is external to the data storage system. Processing may include: responsive to determining that the fingerprint hash table does have the first matching entry that matches the first fingerprint, performing other processing to store the first data of the target logical address as a duplicate of existing data currently associated with the first matching entry. The other processing may include updating mapping information to map the target logical address to a current storage location at which the existing data is stored.

In at least one embodiment, determining the first fingerprint for the first data may include determining a corresponding hash value for the first data using a hash function. The first fingerprint may be a truncated form of the corresponding hash value of the first data. The corresponding hash value for the first data may be mapped to a first index of the fingerprint hash table, and wherein the first matching entry may be associated with the first index. The first matching entry may be included on a list of entries in which each entry of the list includes a different fingerprint that maps to the first index.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
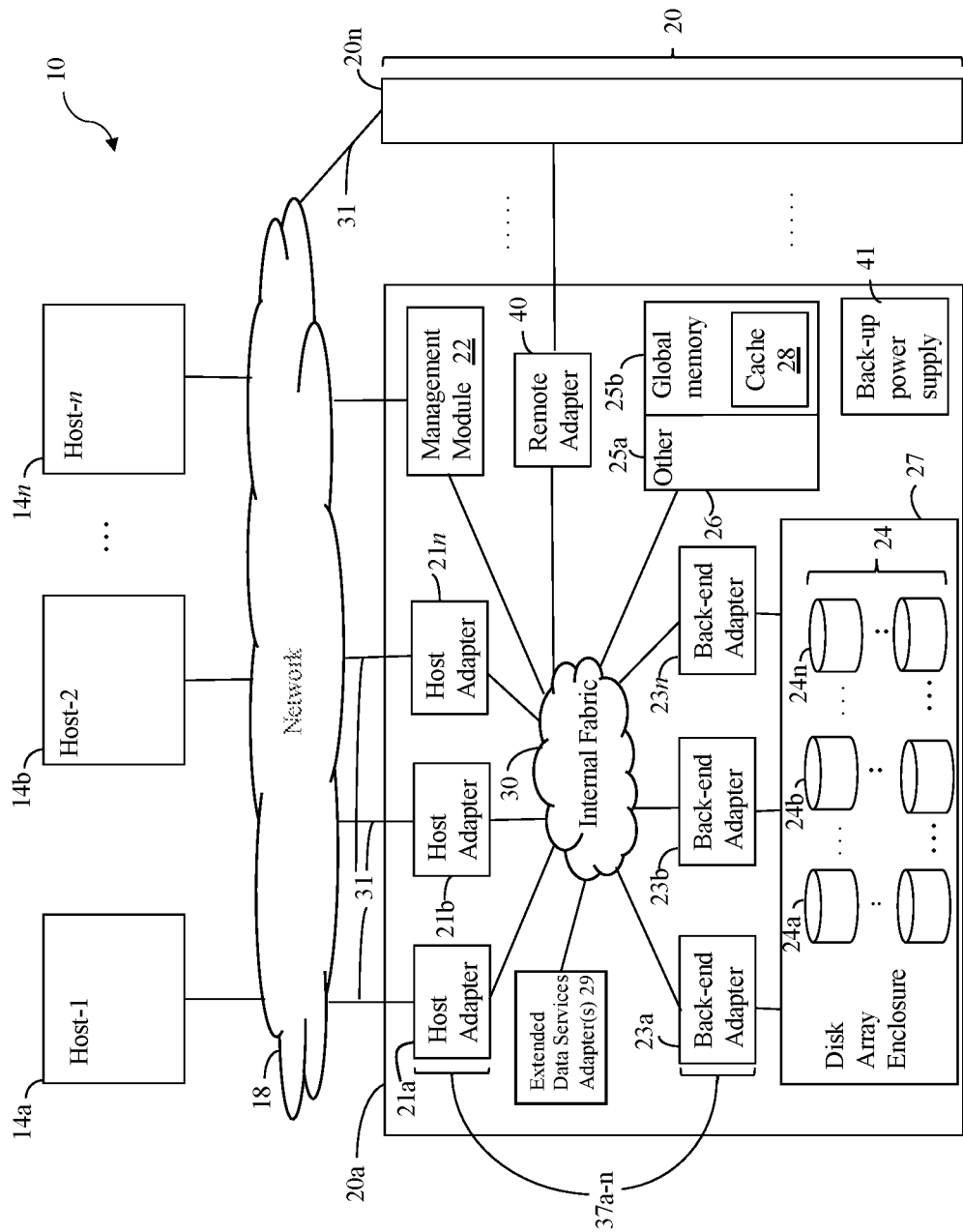
FIG. 1 is a block diagram illustrating an example of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BEA.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
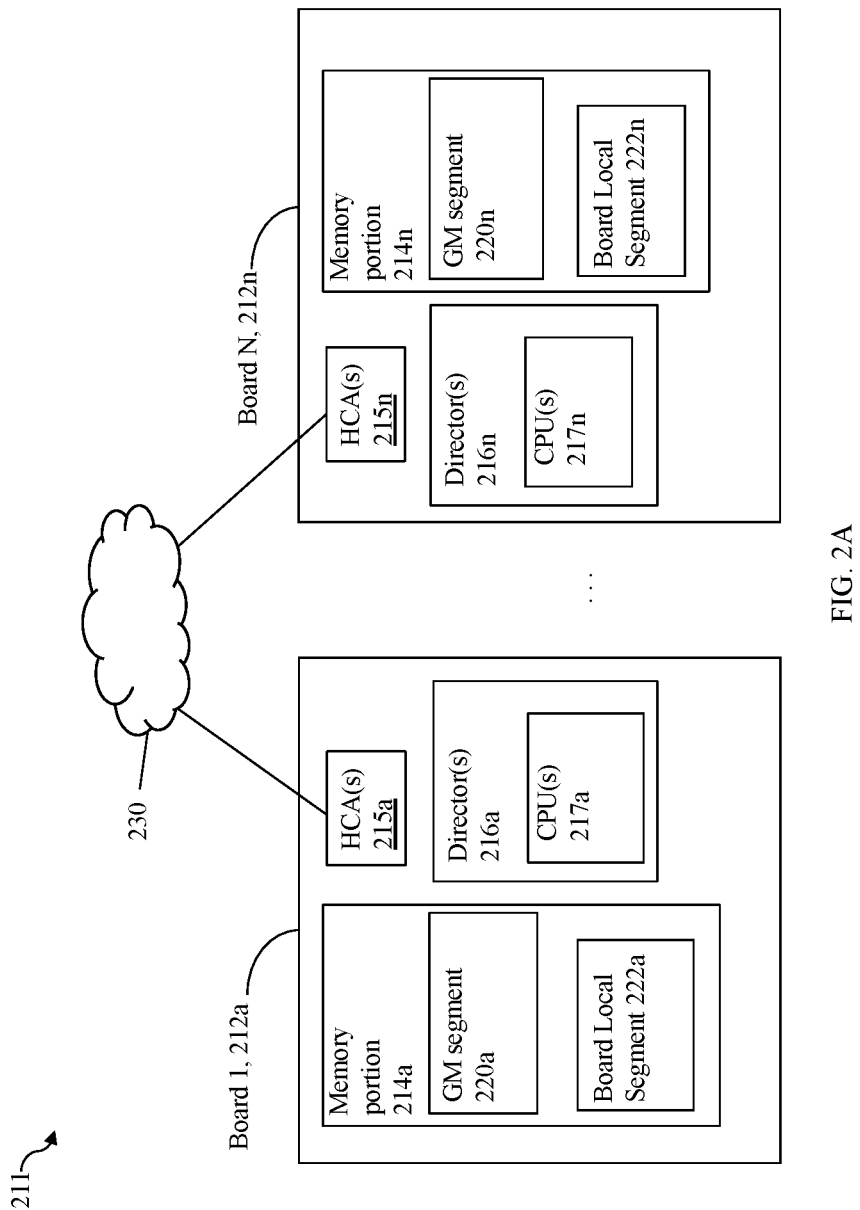
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BEA, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
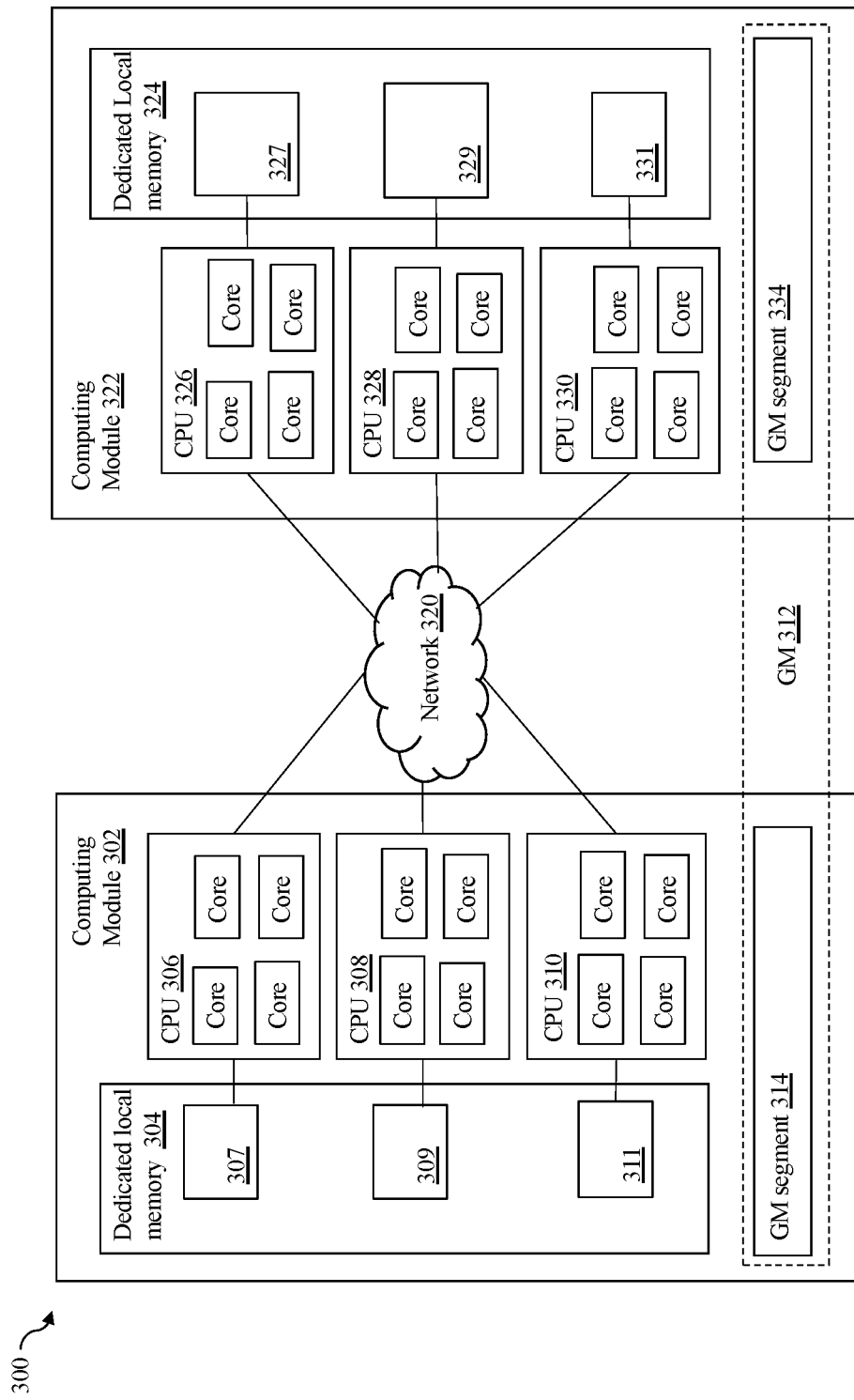
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
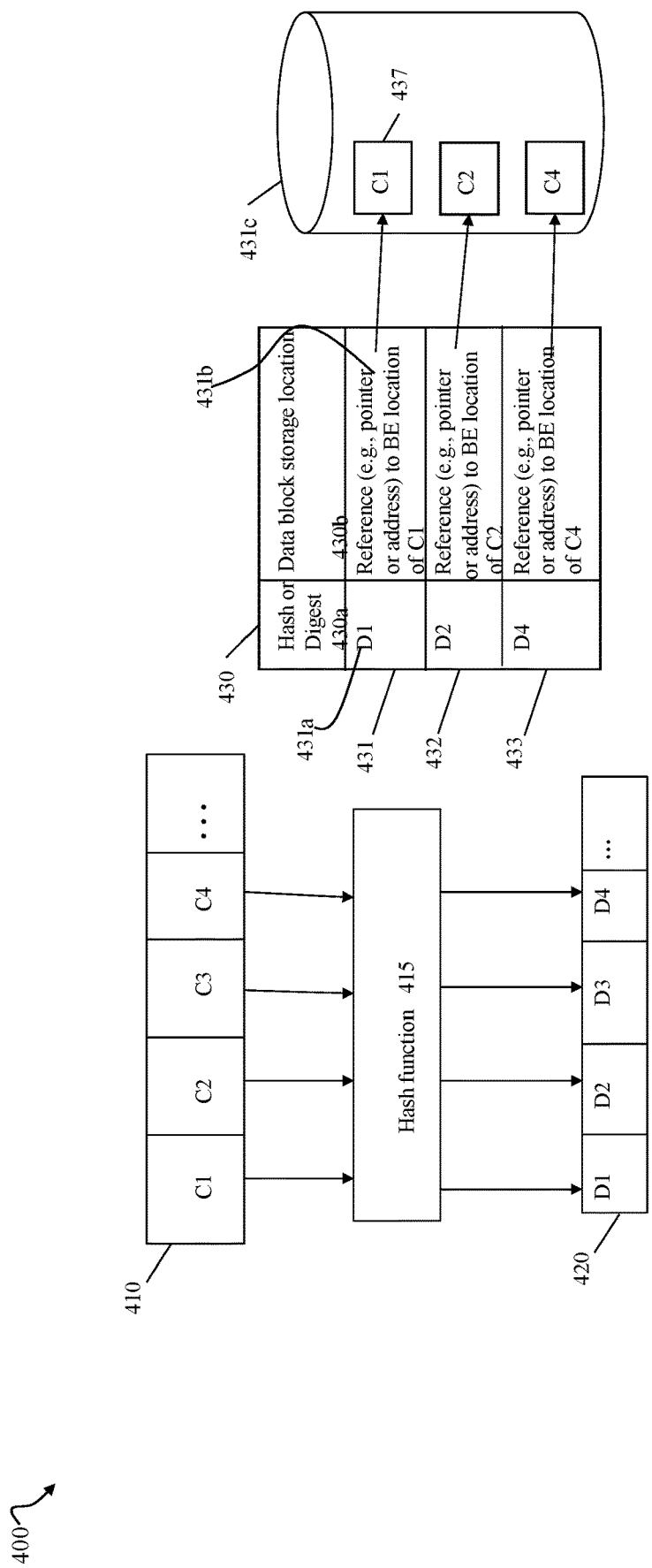
FIG. 3 is an example illustrating hashing in connection with data deduplication.

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUN and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with techniques herein. In at least one embodiment in accordance with techniques herein, data deduplication processing performed may include digest or hash value computation using an algorithm such as based on the SHA-2 (Secure Hash Algorithm 2) family or set of hashing algorithms known in the art. For example, the SHA-2 family includes hash functions with digests or hash values that are 224, 256, 384 or 512 bits in size. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Referring to the FIG. 3, shown is an example 400 illustrating processing that may be performed in connection with data deduplication processing in an embodiment in accordance with techniques herein. The element 410 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. As a variation depending on the data deduplication technique utilized, the blocks of 410 may be of varying or different sizes. Each block is provided as an input to hash function 415. As noted above, in at least one embodiment, the hash function 415 may be a SHA-2 hashing algorithm such as the SHA-256 hashing algorithm, or more generally, any suitable cryptographic, or non-cryptographic hashing function known in the art. For each block of 410, the hash function 415 may perform processing and generate, as an output, a hash value or digest. The element 420 includes digests D1, D2, D3, D4, and the like, where a corresponding different one of the digests DN is generated for one of the blocks CN (where "N" is an integer denoting the block and associated digest generated for that block). For example, D1 is the digest generated for C1, D2 is the digest generated for C2, D3 is the digest generated for C3, and so on. Generally, a hash function 415 is selected which has an acceptably low probability of a "hash collision" of generating the same digest or hash value for two different blocks. The strength of the hash function 415 may be measured by the unlikelihood of a collision occurring where two different input blocks of data produce the same digest. The strength increases with the bit length of the hash value or digest. Thus, if two blocks, such as C1 and C3, have the same digests whereby D1=D3, then blocks C1 and C3 match (e.g., are identical matching data blocks). If two blocks, such as C1 and C4, have different digests whereby D1 does not equal D4, then blocks C1 and C4 do not match (e.g., are different or non-matching data blocks). In cases where two matching or identical blocks have the same digest, only a single copy of the data block is stored on backend non-volatile physical storage of the data storage system. The single stored instance of the data block may be referenced using a pointer, handle, the digest of the block, and the like.

The element 431c of the FIG. 3 may denote the backend (BE) locations of the stored data blocks. The BE locations may be physical storage locations, such as locations on one or more backend PDs accessed by BEAs, where the PDs provide backend non-volatile storage in the data storage system. In this example, as noted above, assume blocks C1 and C3 are the same with remaining blocks C2 and C4 being unique. In at least one embodiment, the data stored on the one or more PDs 431c may be organized and managed using a data structure 430, such as a hash table. In at least one embodiment, computed hashes or digests, or portions thereof, may be used as an index into the hash table 430 along with other metadata. In at least one embodiment each entry of the table or structure 430 may include an entry for each unique or single instance of a data block stored on the PDs 431c. Each entry of the hash table 430 may also include other metadata as may be needed for maintaining the table and also in accordance with the particular hash table management used in an embodiment. Hash tables are data structures known in the art. A hash table uses a hash function to compute an index into an array of entries, buckets or slots, from which the desired data can be found. In this example, the block of data may be mapped by hash function 415, and thus by the block's digest, to a particular entry in the table. Once the particular entry in the table is located, a reference, such as an address or pointer, may be used to obtain the block of data from its physical storage location on the PDs 431c. To further illustrate, the hash function 415 may be used to generate a hash value or digest 430a, such as D1, for a particular data block, such as C1. The hash or digest is then further mapped (e.g., such as by another mathematical function, using particular portions of the digest, and the like) to a particular index or entry of the hash table, where the entry includes a reference 430b to the data block. For example, the digest D1 for the data block C1 may be mapped to the entry 431 of the table 430 C1. The entry 431 includes the digest or hash value 431a, as well as the reference 431b, such as a pointer or address, to the BE location 437, such as a physical storage location, of the data block C1. The particular mapping used to map the digest to a corresponding table entry varies, for example, with the digest and the size of hash table.

When storing a new data block, such as C1, its digest D1 may be mapped to a particular hash table entry 431. If the table entry is null/empty, or the table 430 more generally does not otherwise already include an entry for a data block matching C1, then an entry is created in the table 430 for the new data block C1 along with its associated digest D1 (this is the first time block C1 is recorded in the table 430), physical storage is allocated and used to store the new data block C1, and the entry 431 is updated to reference or map to the BE location 437 of the new data block C1. Otherwise, if there is already an existing entry in the table for a data block matching C1, it indicates that the new data block is a duplicate of an existing block. In this example as noted above, processing is performed for C1, C2, and C4 respectively, where entries 431, 432, and 433 are added since there are no existing matching entries in the hash table. When processing block C3, as noted above, C3 has a digest D3 matching D1 whereby C3 (and thus D3) maps to entry 431 of the hash table. The entry 431 in this case is determined to be non-null and already mapped to the BE location 437 allocated for the data block C1. Therefore, no additional entry is added to the table 431 for C3 and no additional storage is allocated for storing a new data block for C3 since C3 is determined as a duplicate of C1. In connection with representing a particular file or other storage entity including multiple duplicate occurrences of a particular block such as C1, the single instance or copy of the data may be stored in 431c. Additionally, a handle or reference, such as identifying the matching hash table entry 431 may be used to reference the single instance or copy of the data block in 430. When reconstructing or restoring data to its original form, the handle or reference of the corresponding entry 431 into the hash table for the data block C1 may be used to obtain the actual C1 block of data stored in the BE location 437 of the PDs 431c.

The above discussion in connection with FIG. 3 provides a general illustration of how data deduplication processing may be performed. In some systems, the table 430 may be implemented as a hash table as discussed above which additionally provides for mechanism for handling hash collisions where two hash values or digests map to the same index. Any suitable technique known in the art for handling such hash collisions may be utilized.

In the following paragraphs, a hash table such as the table 430, used for storing information regarding unique data blocks in connection with deduplication is referred to as a fingerprint hash table or fingerprint table. Additionally, the hashes, digests, or hash values that are determined using a hash function for data blocks and used in connection with the fingerprint hash table may be referred to as fingerprints.

Consistent with discussion herein, when writing a data block to a target logical address, such as to an LBA of a LUN, the data may be stored in the cache and then later destaged from the cache to backend physical storage. In connection with destaging the data from the cache to physical storage, deduplication processing and compression processing may be performed. The deduplication processing may be performed to determine whether the data block that is destaged is a duplicate of an existing unique data block already stored in the data storage system. In connection with making this determination, processing may include determining a fingerprint of the data block being destaged from the cache. If there is not already an existing matching entry in the fingerprint hash table for the fingerprint, then the data block is a new unique data block. Processing performed may include inserting a new entry in the fingerprint table for the fingerprint, allocating storage for the new data block, and storing the new data block in the allocated storage. If there is a matching entry in the fingerprint hash table for the fingerprint, then the data block is a not a new unique data block and is rather a duplicate of the data block corresponding to the matching entry. In this case, deduplication processing may be performed in which the target logical address of the write operation may be mapped to the same single instance of the data block already stored on backend physical storage.

In some systems, the fingerprint hash table may be very large. For example, the fingerprint hash table may have billions of entries for use in storing data on 4 petabytes (PB) of BE physical storage. Management of the fingerprint hash table may be challenging due, at least in part, to its large size and may require fast and efficient management techniques and operations performed using the fingerprint hash table. For example, such operations may include querying looking up an entry in the fingerprint hash table, inserting an entry for fingerprint in the fingerprint hash table, and deleting an entry in the fingerprint hash table.

Fingerprint insertion may be performed when inserting a new entry into the fingerprint hash table, for example, such as described above if there is not already an existing matching entry in the table in the case where the data block written is a new unique data block. Fingerprint lookup or querying may be performed, for example, when querying the fingerprint hash table to locate a matching entry for a candidate data block and its associated fingerprint. In this case, if a matching entry of the fingerprint hash table is found for the associated fingerprint of the candidate data block, the candidate data block is determined to be a duplicate of the existing data block of the matching entry.

Fingerprint deletion may be an operation performed when there is a need to delete an existing entry of the fingerprint hash table. For example, in the case where the data written to a target logical address is actually overwriting existing data already stored at the target logical address, the old or existing data's fingerprint may need to be deleted from the fingerprint hash table. As another example, in the case where a particular LUN is deleted, the fingerprints associated with data stored on the deleted LUN may need to be deleted from the fingerprint hash table. Generally, an operation that deletes an existing logical block or LBA may result in the need to delete an existing entry in the fingerprint hash table, where the existing entry is associated with a fingerprint of the data block stored on the deleted LBA.

In order to delete a fingerprint entry having a first fingerprint from the fingerprint hash table, the data or content may be used to generate the first fingerprint or the first fingerprint of such data must be known. In some systems, the first fingerprint may not be directly stored in existing structures whereby the first fingerprint is then generated using the data or content. However, such data or content used to generate the first fingerprint may not be readily available. For example, prior to overwriting an LBA with new data, the LBA's old or existing data may be known by reading the old data from the backend PDs thereby requiring additional system resources to obtain the old data. The foregoing has an undesirable drawback of using additional system resources in obtaining the old data, such as from the backend PDs, and also in calculating the fingerprint for the old data.

Described in the following paragraphs are techniques that may be used to efficiently perform fingerprint hash table operations such as deleting a fingerprint and its entry, inserting a fingerprint and its entry, and querying the fingerprint table in an attempt to locate a matching fingerprint for a candidate data block undergoing deduplication processing.

In at least one embodiment, deduplication processing may use a fingerprint hash table as well as a second hash table, the BE location hash table. Generally the fingerprint hash table provides for accessing entries and thus fingerprints of the entries based on fingerprint values. The BE location hash table provides for accessing the fingerprints and thus entries of the fingerprint hash table based on BE locations. The BE locations may generally refer to the BE storage locations of the unique data blocks that are used to generate the fingerprints in the fingerprint hash table. The BE locations may be used by BE components such as the BEAs. In at least one embodiment, the BE location hash table may be indexed using a hash value, or truncated portion thereof, determined for a BE location of a data block. Each entry of the BE location hash table may be created for a particular BE location at which a unique data block is stored, where the unique data block is used in connection with deduplication processing. The entry of the BE location hash table for the particular BE location may reference or point to a corresponding entry in the fingerprint hash table that includes the fingerprint of the data block stored at the particular BE location. Thus, the BE location hash table provides an additional way to access the fingerprints and thus entries of the fingerprint hash table, where the additional way is based on BE locations of the data blocks used to generate the fingerprints.

In at least one embodiment in which compression performed in combination with deduplication, the actual size of the compressed block may be less than one block. Thus generally, when a unique data block is compressed and then stored in the BE, the BE allocation unit size or space may be the same size as the FE block or smaller depending on the size of the compressed form of the contents of the data block. In at least one embodiment, the size of an uncompressed data block may be 128K bytes in size. Thus, in at least one embodiment, each data block destaged from the cache and for which deduplication is performed may be 128K bytes. In an embodiment performing compression in combination with deduplication processing, each unique data block having a fingerprint and corresponding entry in the fingerprint hash table may be further compressed and thus stored in its compressed form in a BE location.

In at least one embodiment, the entries of the entire fingerprint hash table may be distributed among multiple EDSs in equal portions or partitions. In turn the EDs each manage their respective portion partition of the fingerprint hash table. For example, in at least one embodiment, there may be 16 EDSs that each manage a different portion of the fingerprint hash table. The particular EDS that manages and stores a particular entry in the fingerprint hash table for a fingerprint may be derived from, or based on, the fingerprint. Generally, an embodiment may use any suitable technique to map a particular fingerprint to its owning EDS, where the owning EDS may perform desired operations with respect the entry of the particular fingerprint. In at least one embodiment, the owning EDS for particular fingerprint having a data block stored at a BE location may be stored in metadata associated with the BE location.

In at least one embodiment, the fingerprints may be truncated hash values generated from their respective data blocks. The fingerprint hash table may be organized into buckets, where each bucket is associated with a different index of the fingerprint hash table. Generally, the fingerprint of a data block may be used to determine an index, and thus bucket of entries associated with the index. An entry for the fingerprint of the data block is included in the bucket associated with the index. In at least one embodiment, each bucket of entries of the fingerprint hash table may be implemented as a list of entries, where each entry on the list has an associated fingerprint that is mapped to the same index associated with the bucket.

In at least one embodiment, the BE location hash table may also organized into buckets where each bucket is associated with a different index of the BE location hash table. Generally, the BE location of a data block may be used to determine an index, and thus bucket of entries associated with the index. An entry for the BE location of the data block is included in the bucket associated with the index of the BE location hash table. In at least one embodiment, each bucket of entries of the BE location hash table may be implemented as a list of entries, where each entry on the list has an associated BE location that is mapped to the same index associated with the bucket.

It should be generally noted that the terms digest, hash value, hash and fingerprint may be used interchangeably in various contexts herein to refer to an output generated by a hash function. In some contexts and in some embodiments, a hash value or hash may be directly output by a hash function for a particular input, and a truncated form of the hash function output may be used as the digest or fingerprint that is mapped to an index or bucket in a hash table. For example, in at least one embodiment, a hash function may be used as described herein in connection with generating the fingerprint for data. The hash function may be cryptographic hash function that generates a hash value of a certain size such as a number of bytes. In at least one embodiment, the fingerprint of a block of data may be a truncated hash value computed by the hash function. For example, the fingerprint may be a specified portion of the bytes of the hash value computed by the hash function. In other embodiments, the entire hash value directly output by the hash function may be used and mapped to an index or bucket of a hash table. For example, in at least one embodiment, the fingerprint for a data block may be all bytes of the hash value computed using a hash function, where the hash value is used as the fingerprint that is mapped to an index or bucket of the fingerprint hash table.

The foregoing and other aspects of the techniques herein are described in more detail in the following paragraphs.

Figure 4:
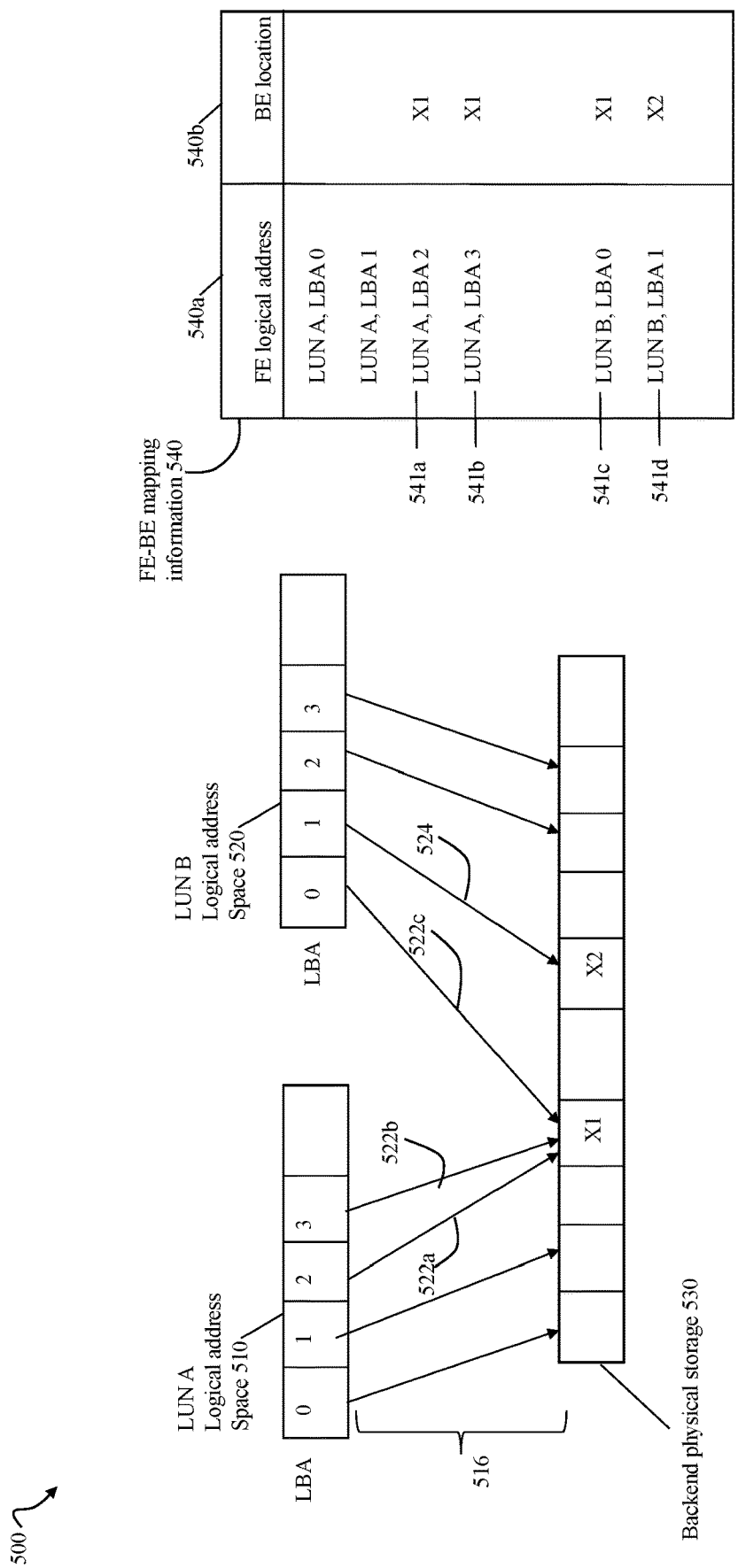
FIG. 4 is an example illustrating physical to logical address mapping in connection with data deduplication in an embodiment in accordance with the techniques herein.

Referring to FIG. 4, shown is an example illustrating data deduplication and associated mappings between logical addresses and physical storage in an embodiment in accordance with the techniques herein. The example 500 includes a representation of the logical address space or range of LUN A 510, a representation of the logical address space or range of LUN B 520, and a representation of the backend physical storage 530. The element 530 may denote the physical storage of one or more tiers of backend non-volatile PDs in a data storage system. Each block or box in 510 denotes a logical block address (LBA) of a block of data stored in LUN A. Each block or box in 520 denotes a logical block address (LBA) of a block of data stored in LUN B. Each block or box in 530 denotes a chunk of storage allocated for storing a block of data. The arrows 516 denote the mapping of LBAs of the logical address spaces 510, 520 to physical storage chunk of 530 including the data or content stored at the particular LBAs. For example, the arrows 522*a-c* indicate, respectively, that LUN A LBA 2, LUN A LBA 3, and LUN B LBA 0 all store the same data content and are therefore mapped to the same physical storage location X1. Thus, the arrows 522*a-c* denote the mappings as a result of data deduplication. For example, LUN A LBA 2 may have initially written the data contents stored at the physical location X1 at a first point in time. At later points in time, additional writes to LUN A LBA 3 and LUN B LBA 0 may have subsequently written data determined by data deduplication processing to be a duplicate of the data content of X1. In this case, deduplication processing results in mapping the logical addresses of LUN A LBA 3 and LUN B LBA 0 to the single or unique data instance stored at X1.

In contrast to the arrows 522*a-c*, the arrow 524 indicates that LUN B LBA 1 is mapped to the physical storage location X2. The example 500 indicates that no other logical address of 510 and 520 besides LUN B LBA 1 is currently mapped to the physical location X2.

Also included in FIG. 4 is front end to back end (FE-BE) mapping information 540. The mapping information 540 may be generally characterized as a type of FE metadata. The mapping information 540 may be used, for example, by a component such as an FA. The mapping information 540 may be used to determine the back end (BE) location 540*b*, such as a physical storage location, storing data for a corresponding front end (FE) logical address 540*a*. The mapping information 540 may include the mapping information for the logical address spaces 510 and 520. For example, the entry 541*a* indicates that the data of the logical address LUNA, LBA 2 is stored at the BE location X1. The entry 541*b* indicates that the data of the logical address LUNA, LBA 3 is stored at the BE location X1. The entry 541*c* indicates that the data of the logical address LUNB, LBA 0 is stored at the BE location X1. The entry 541*d* indicates that the data of the logical address LUNB, LBA 1 is stored at the BE location X2.

Figure 5:
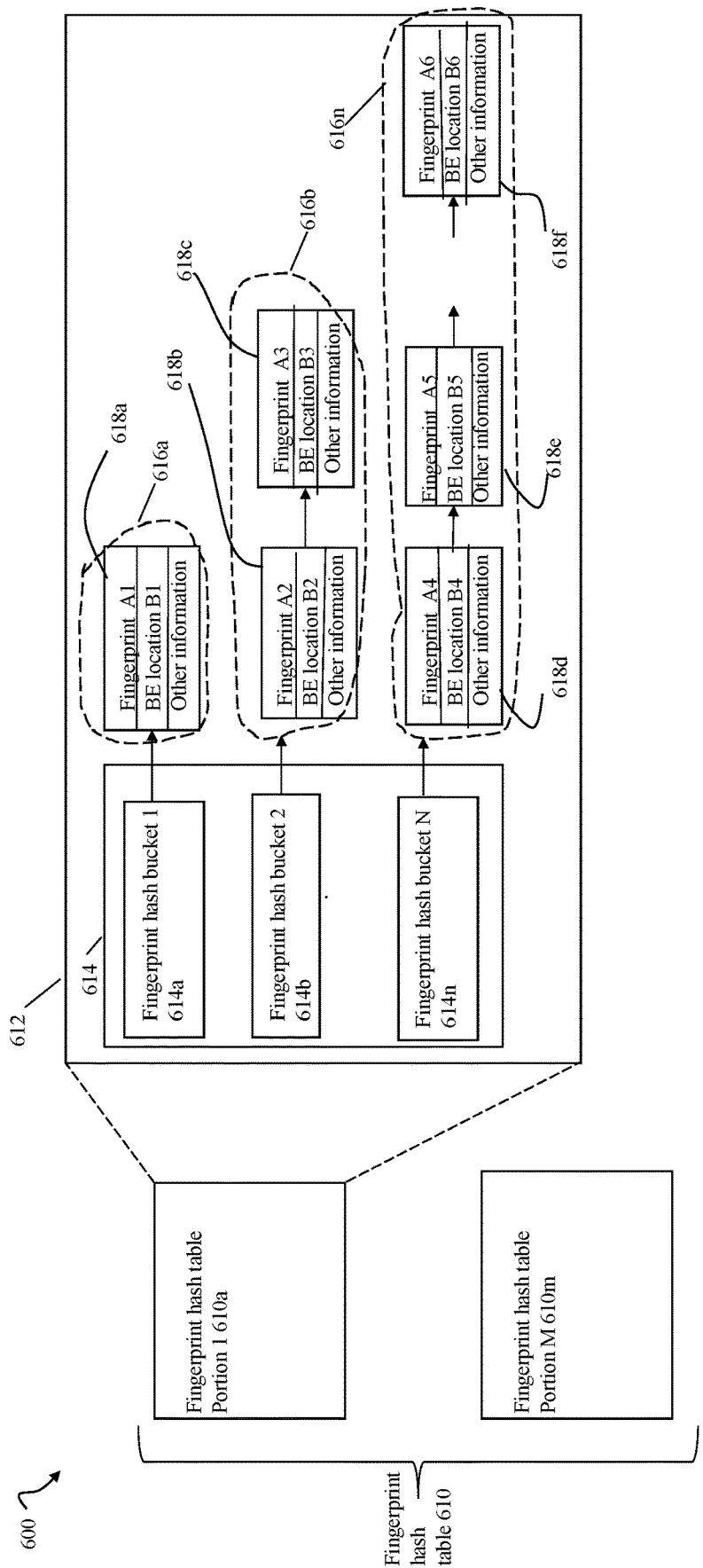
FIGS. 5, 6A and 6B are examples of data structures that may be used an embodiment in accordance with the techniques herein.

Referring to FIG. 5, shown is an example 600 illustrating a representation of the fingerprint hash table 610 that may be used in an embodiment in accordance with the techniques herein. Consistent with other discussion herein, the element 610 may denote the entire fingerprint hash table that is partitioned into multiple portions 610*a-m*. In at least one embodiment in which m=16, there may be 16 EDSs each designated as the owning EDS for a different one of the portions 610*a-m*. Each of the portions 610*a*-M may have the same number of hash buckets or indices.

The element 612 provides additional detail regarding the fingerprint hash table portion 610*a*. More generally, each of the portions 610*a*-M may also have an organization and representation as denoted by the element 612. The portion 610*a* has N indices associated respectively with N fingerprint hash buckets 614*a-n*. The element 614 denotes the head pointers of the N buckets 614*a-n*. In this example, each bucket of entries associated with one of the indices may be implemented as a list. In at least one embodiment, each such list may be implemented as a suitable linked list data structure. As discussed in more detail below, each entry of the fingerprint hash table 610 includes a fingerprint of a data block, a BE location of where the data block is stored, and optionally other information.

In the example 600, the fingerprint hash bucket 614*a* has an associated list 616*a* including a single entry. The entry 618*a* in the list 616*a* includes the fingerprint A1 for a data block stored at the BE location B1. The fingerprint hash bucket 614*b* has an associated list 616*b* including two entries. The entry 618*b* in the list 616*b* includes the fingerprint A2 for a data block stored at the BE location B2. The entry 618*c* in the list 616*b* includes the fingerprint A3 for a data block stored at the BE location B3. The fingerprint hash bucket 614*n* has an associated list 616*n* including 3 or more entries. The entry 618*d* in the list 616*n* includes the fingerprint A4 for a data block stored at the BE location B4. The entry 618*e* in the list 616*n* includes the fingerprint A5 for a data block stored at the BE location B5. The entry 618*f* in the list 616*n* includes the fingerprint A6 for a data block stored at the BE location B6.

As discussed elsewhere herein, multiple fingerprints or hash values may be mapped to the same index and bucket. In the example 600, associating a bucket of entries with each index is one way in which hash collisions may be handled in an embodiment in accordance with the techniques herein.

In connection with the I/O or data path when destaging a candidate data block stored at a target logical address from the cache, the fingerprint for the candidate data block may be determined in a first step S1. The fingerprint may be determined by calculating a hash value for the candidate data block using a hash function. In at least one embodiment, the fingerprint may be a truncated portion of the hash value. In a second step S2 subsequent to S1, the owning EDS may be determined using the fingerprint. In at least one embodiment, the owning EDS may be determined using a function that maps a fingerprint to its owning EDS.

In a third step S3 subsequent to S2, a lookup or query operation may be performed of the particular fingerprint hash table portion of the owning EDS. For example, assume the fingerprint of the data block is an integer denoted by A3 where the owning EDS is determined as EDS 1 that manages fingerprint hash table portion 610*a*. Processing may be performed that maps the fingerprint A3 to an index of 2, and thus to the fingerprint hash bucket 2 614*b*. The list 616*b* may then be traversed to determine whether any entry of the list 616*b* has a fingerprint value that matches the fingerprint A3 of the candidate data block. In this case, the entry 618*c* is determined to have a fingerprint A3 that matches the fingerprint A3 of the candidate data block. At this point processing determines that the candidate block is a duplicate of an existing data block stored at the BE location B3 of the matching entry 618*c*. The target logical address associated with the candidate data block may have its associated FE-BE mapping information (e.g., as described in connection with the FIG. 4) updated to point to or reference the BE location B3.

Figure 6A:
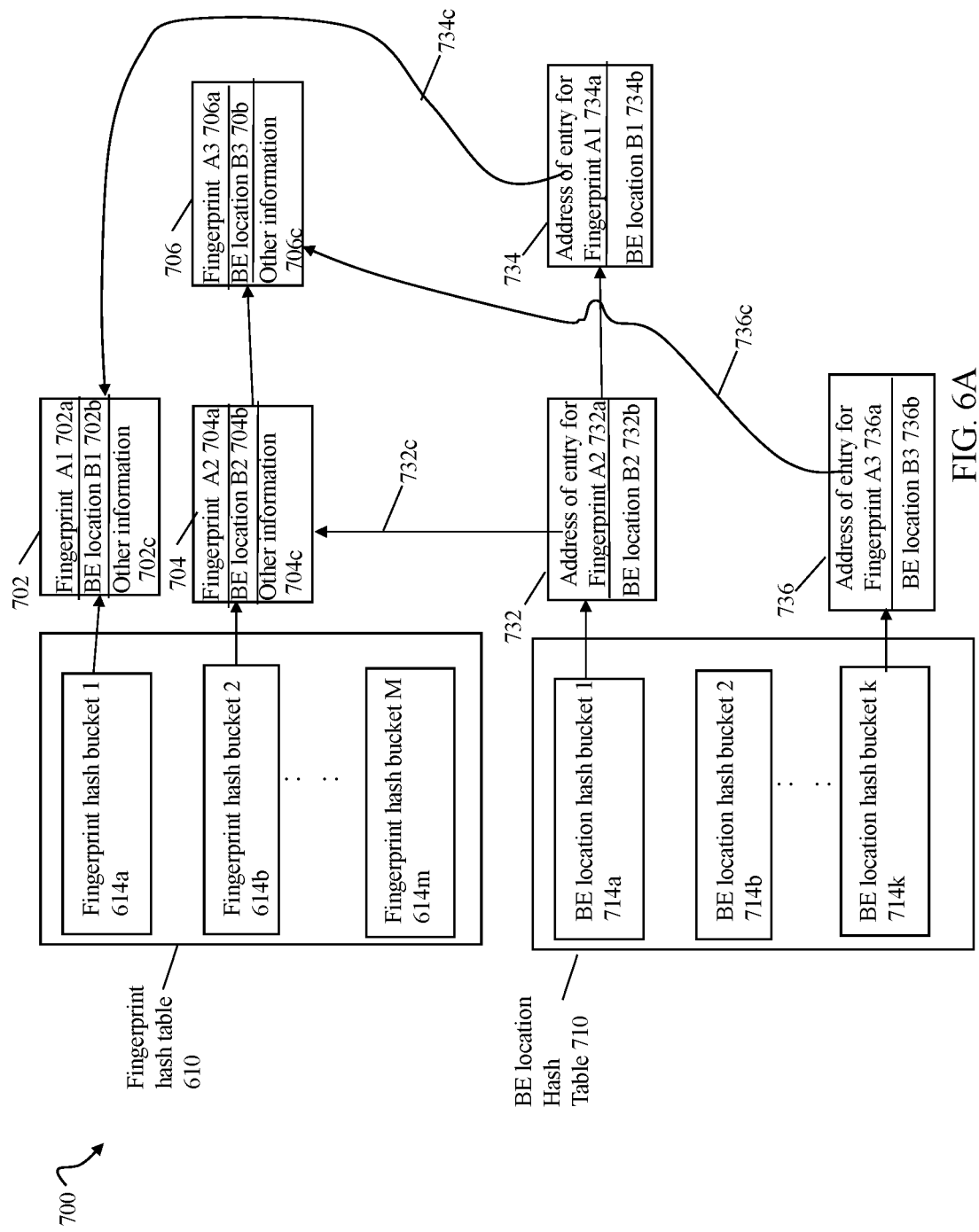

Referring to FIG. 6A, shown is an example 700 including the representation of the fingerprint hash table 600 of FIG. 5 and additional including a representation of the BE location hash table 710. The hash table 610 of the FIG. 6A may be as described in connection with the FIG. 5. The BE location hash table 710 includes k indices associated with BE location hash buckets 714*a-k*. Each of the BE location hash buckets 714*a-k* may be implemented as a list of entries as described in connection with the table 610. However, in this example, each entry of the table 710 includes: 1) a pointer to, or an address of, an entry in the table 610 for a particular fingerprint and 2) a BE location of the unique data block used to generate the particular fingerprint.

For example, the BE location hash bucket 1 714*a* includes the entries 732 and 734. The entry 732 includes: a first field 732*a* denoting the address of an entry in the table 610 for the fingerprint A2, and a second field 732*b* denoting the BE location B2 where the data block having the fingerprint A2 is stored. The field 732*a* includes the address of the entry 704 in the table 610, where the entry 704 includes the fingerprint A2 704*a*. Element 732*c* represents the field 732*a* pointing to or referencing the entry 704 of the table 610. Thus, the entry 704 including the fingerprint A2 may be accessed using the BE location B2 of the data block having the fingerprint A2. In particular, a hash value H may be determined for the BE location B2 where H is then mapped to the index 1 and thus mapped to the BE location hash bucket 714a. The bucket of entries associated with 714a may be searched to locate an entry having a BE location field with a value that matches the BE location B2. In this case, the entry 732 may be located as the matching entry for the BE location B2. The field 732a of the entry 732 may then be used to access the entry 704 of the table 610 including the desired fingerprint. The foregoing processing may be performed, for example, in connection with deleting an existing fingerprint and entry from the fingerprint hash table 610. As discussed elsewhere herein, deleting an existing fingerprint may be performed in connection various operations such as, for example, overwriting existing data stored at a target logical address with new data whereby the existing fingerprint and entry 704 of table 610 for the existing data may be deleted from the table 610.

The entry 734 of the BE location hash table 710 includes: a first field 734a denoting the address of an entry in the table 610 for the fingerprint A1, and a second field 734b denoting the BE location B1 where the data block having the fingerprint A1 is stored. The field 734a includes the address of the entry 702 in the table 610, where the entry 702 includes the fingerprint A1 702a. Element 734c represents the field 734a pointing to or referencing the entry 702 of the table 610. Thus, the entry 702 including the fingerprint A1 may be accessed using the BE location B1 of the data block having the fingerprint A1. In particular, a hash value H may be determined for the BE location B1 where H is then mapped to the index 1 and thus mapped to the BE location hash bucket 714a. The bucket of entries list associated with 714a may be searched to locate an entry having a BE location field with a value that matches the BE location B1. In this case, the entry 734 may be located as the matching entry for the BE location B1. The field 734a of the entry 734 may then be used to access the entry 702 of the table 610 including the desired fingerprint. The foregoing processing may be performed, for example, in connection with deleting an existing fingerprint and entry from the fingerprint hash table 610. As discussed elsewhere herein, deleting an existing fingerprint may be performed in connection various operations such as, for example, overwriting existing data stored at a target logical address with new data whereby the existing fingerprint and entry 702 of table 610 for the existing data may be deleted from the table 610.

In the example 700, the BE location hash bucket 2 714b does not include any entries and the BE location hash bucket k 714k includes a single entry 736. The entry 736 of the BE location hash table 710 includes: a first field 736a denoting the address of an entry in the table 610 for the fingerprint A3, and a second field 736b denoting the BE location B3 where the data block having the fingerprint A3 is stored. The field 736a includes the address of the entry 706 in the table 610, where the entry 706 includes the fingerprint A3 706a. Element 736c represents the field 736a pointing to or referencing the entry 706 of the table 610. Thus, the entry 706 including the fingerprint A3 may be accessed using the BE location B3 of the data block having the fingerprint A3. In particular, a hash value H may be determined for the BE location B3 where H is then mapped to the index k and thus mapped to the BE location hash bucket 714k. The bucket of entries associated with 714k may be searched to locate an entry having a BE location field with a value that matches the BE location B3. In this case, the entry 736 may be located as the matching entry for the BE location B3. The field 736a of the entry 736 may then be used to access the entry 706 of the table 610 including the desired fingerprint A3. The foregoing processing may be performed, for example, in connection with deleting an existing fingerprint and entry from the fingerprint hash table 610. As discussed elsewhere herein, deleting an existing fingerprint may be performed in connection various operations such as, for example, overwriting existing data stored at a target logical address with new data whereby the existing fingerprint and entry 706 of table 610 for the existing data may be deleted from the table 610.

In at least one embodiment, an overwrite may occur when a write operation writes new data to a target logical address and there is already existing data stored at the target logical address. Assuming that no other logical address references the existing data, the fingerprint and entry for the existing data may be deleted from the fingerprint hash table 610. In particular, the FE-BE mapping information for the LUN of the target logical address may be used to determine the BE location B of the existing data. The BE location B for the existing data may be used with the BE location hash table 710 as described above to locate a matching entry for B. The matching entry of the table 710 points to a second entry of the table 610, where the second entry includes the fingerprint F of the existing data. The second entry may be deleted from the table 610, for example, by obtaining the owning EDS of the second entry and then performing processing to have the owning EDS delete the second entry from the table 610.

In at least one embodiment, when a fingerprint is deleted from the fingerprint hash table 610, processing may also be performed to delete an associated entry from the BE location hash table 710. For example, if an entry 704, 702 or 706 is deleted from the table 610, the respective associated entry 732, 734 or 736 may also be deleted from the table 710.

When inserting a fingerprint as a new entry into the fingerprint hash table 610, an associated new entry is also inserted into the BE location hash table 710. For example, as discussed above, in connection with the I/O or data path when destaging a candidate data block stored at a target logical address from the cache, the fingerprint for the candidate data block may be determined in the first step S1. The fingerprint may be determined by calculating a hash value for the candidate data block using a hash function. In at least one embodiment, the fingerprint may be a truncated portion of the hash value. In the second step S2 subsequent to S1, the owning EDS may be determined using the fingerprint. In at least one embodiment, the owning EDS may be determined using a function that maps a fingerprint to its owning EDS.

In the third step S3 subsequent to S2, a lookup or query operation may be performed of the particular fingerprint hash table portion of the owning EDS. For example, with reference to the FIG. 6A, assume the current state of the tables 610 and 710 are as in the example 700 and a lookup or query is perform for the fingerprint A9 of the data block where the owning EDS is determined as EDS 1 that manages a portion of the fingerprint hash table including fingerprint hash bucket 1 614a. Processing may be performed that maps the fingerprint A9 to an index of 1, and thus to the fingerprint hash bucket 1 614a. The bucket of entries 614a may then be traversed to determine whether any entry of the bucket 614a has a fingerprint value that matches the fingerprint A9 of the candidate data block. In this case, the bucket 614a includes only the single entry 702 that is not determined as a matching entry for the fingerprint A9 of the candidate data block. At this point processing determines that the candidate block is a new unique data block and is not a duplicate of an existing unique data block.

Figure 6B:
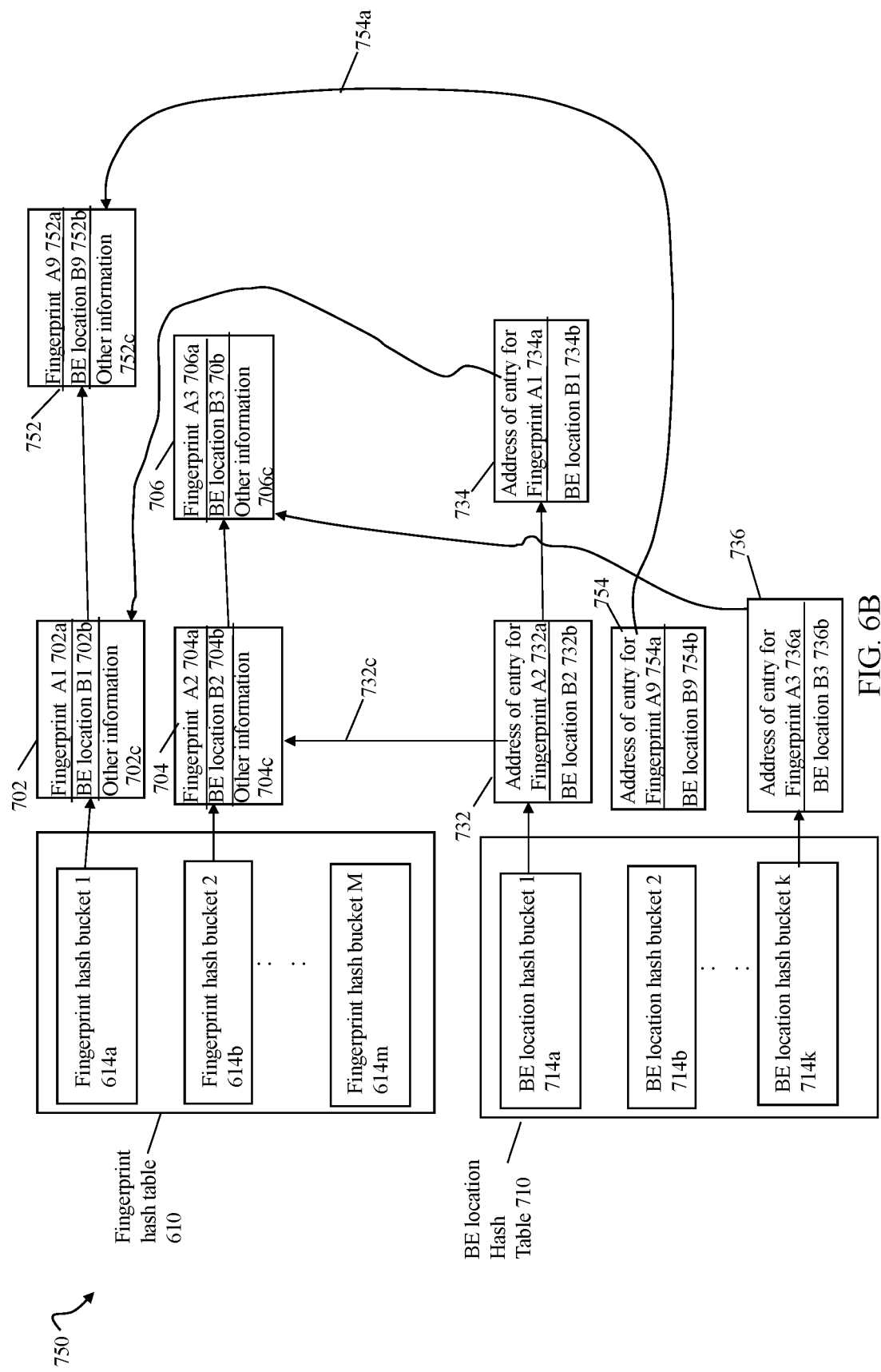

With reference now to FIG. 6B and in a fourth step S4 subsequent to S3, processing may be performed to insert a first new entry 752 with the fingerprint A9 into the fingerprint hash table 610. In this particular example, the new entry 752 may be added to the fingerprint hash bucket 1 614a. The processing of the step S4 may include allocating a new BE location B9 and storing the candidate data block at the BE location B9. The processing of the step S4 may include initializing the new entry 752. For example, the fingerprint A9 752a and the BE location B9 752b may be stored in the new entry 752, and the new entry 752 may then be added to the bucket 614a. Additionally, another corresponding new entry 754 is also made in the BE location hash table 710 for the newly allocated BE location B9. In particular, a hash value H is determined for the new BE location B9. The hash value H is then mapped to an index of the BE location hash table 710. For example, assume that H maps to the BE location hash bucket 2 714b. In this case, the second new entry 754 is added to the bucket 714b where the second new entry 754 includes the BE location B9 754b and also includes the address or pointer 754a to the first new entry just added to the table 610. The arrow 754a illustrates the field 754a including the address that points to or references the entry 752 of the table 610. Additionally, the target logical address associated with the candidate data block may have its associated FE-BE mapping information (e.g., as described in connection with the FIG. 4) updated to point to or reference the BE location B9.

In connection with the structures of the FIGS. 6A and 6B, an entry of the BE location hash table 710 and its associated entry of the fingerprint hash table 610 both include a separate instance or copy of the BE location as an element or field. For example, entry 732 of the table 710 has an associated entry 704 in the table 610. The entry 732 includes the BE location B2 732b, and additionally, the entry 704 also includes the BE location B2 704b. It should be noted that an embodiment may alternatively store a single BE location instance only in the entries of the table 610 and may omit the second instances of the BE locations in the table 710. For example, the BE location B2 may be stored only in the entry 704 of the fingerprint table 610 and the additional field 732b may be omitted from the entry 732 of the table 710. In such an embodiment, the BE location B2 704a may be accessed as needed indirectly using the pointer or address 732a of the entry 732 in the table 700.

In connection with the structures of the FIGS. 6A and 6B, there is a pointer or reference between each entry of the BE location hash table 710 and its associated entry in the fingerprint hash table 610. For example, element 732a of the entry 732 in the table 710 points (732c) to its associated entry 704 in the table 610. Although not illustrated in the FIGS. 6A and 6B, an embodiment may additionally include another pointer or reference from each entry in the fingerprint hash table 610 and its associated entry in the BE location hash table 710. For example, an embodiment the entry 704 of the table 610 may also reference or point to its associated entry 732 in the table 710. In this latter example, the entry 704 of the table 610 may include an additional pointer field with the address of the entry 732 of the table 710. The foregoing dual pointers between associated entries of the tables 610 and 710 may be useful for different operations. For example, assume a fingerprint F is available and known but not the corresponding BE location B. Also assume the fingerprint F is included in the entry E1 in the table 610 and that the entry E2 of the table 710 is the corresponding entry for the BE location B. In this case, the entry E1 in the BE location hash table 710 may be deleted as needed using the fingerprint F by locating the matching entry E1 in the table 610 for the fingerprint F, and accessing the additional pointer of the matching entry E1, where the additional pointer points to its associated entry E2 in table 710. In an embodiment that does not have this additional pointer from an entry of the table 610 to its associated entry in the table 710, processing to delete the entry E1 in the BE location hash table 710 may include: performing a lookup in the table 610 for the matching entry E1 for the fingerprint F, obtaining the BE location B from the entry E1, and performing another lookup in the table 710 using BE location to locate the entry E2 as a matching entry for the BE location B.

Figure 7:
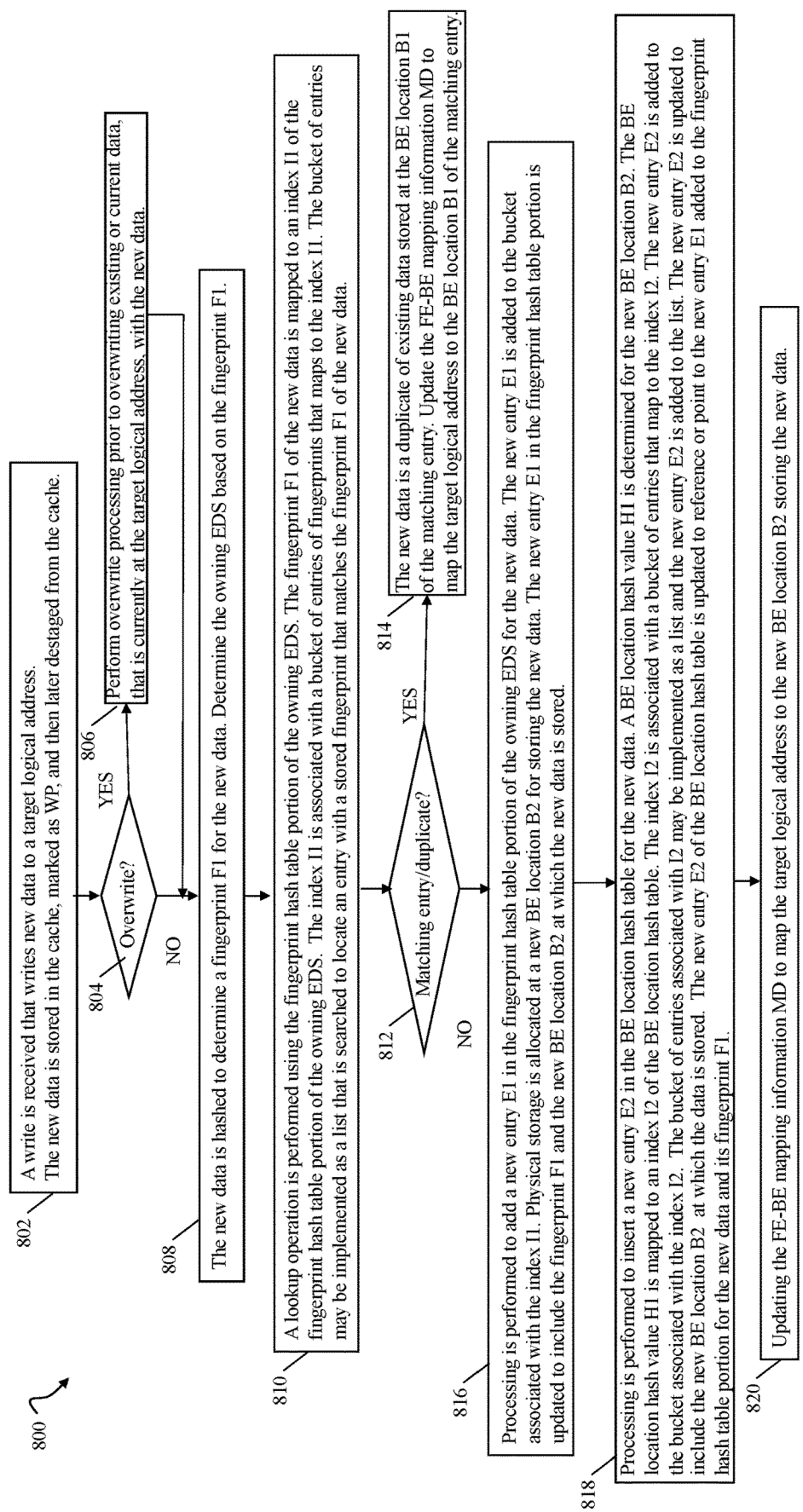
FIGS. 7 and 8 are flowcharts of processing steps that may be performed in an embodiment in accordance with the techniques herein.
Figure 8:
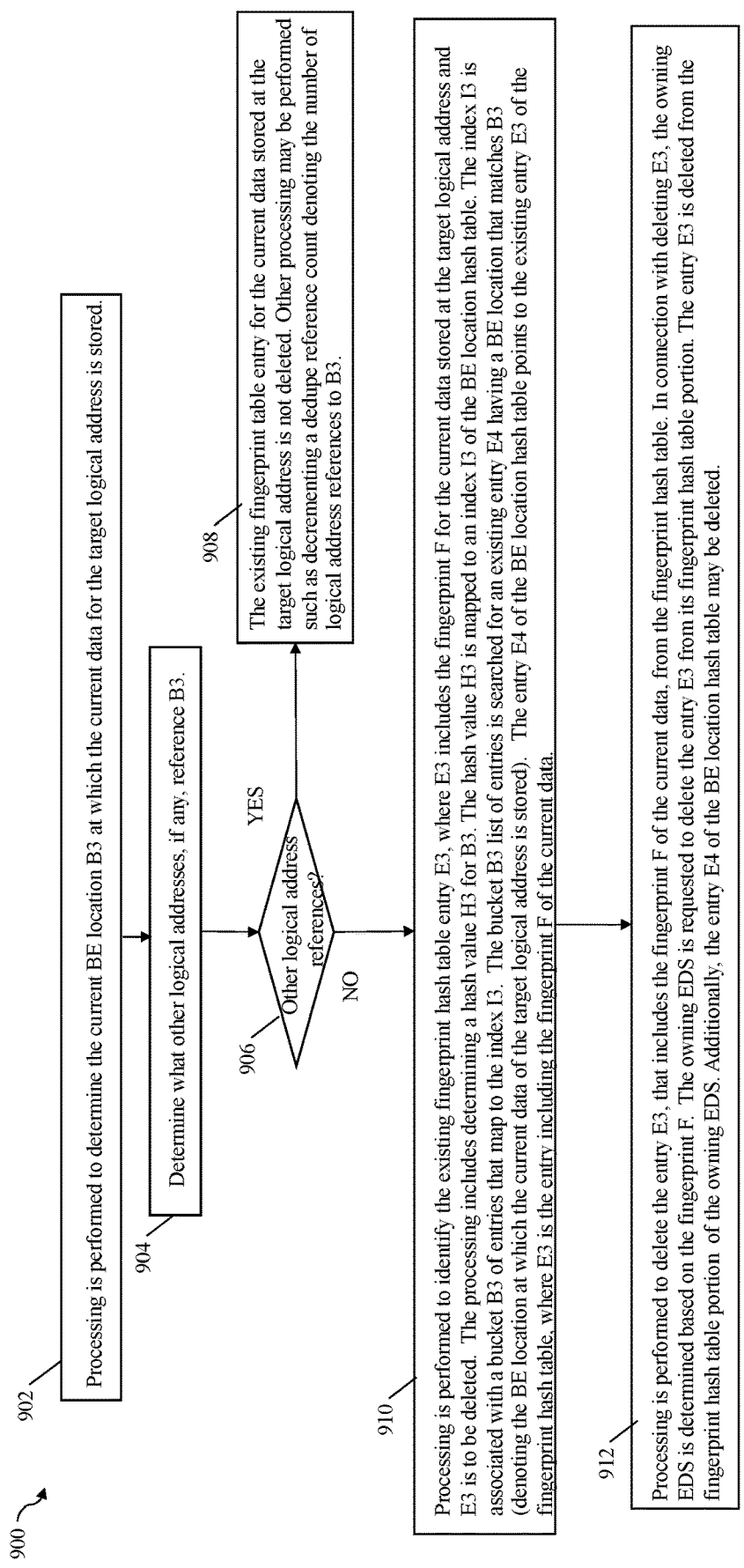

What will now be described in connection with FIGS. 7 and 8 are flowcharts summarizing processing as described above.

Referring to FIG. 7, shown is a first flowchart 800 of processing steps that may be performed in an embodiment in accordance with the techniques herein.

At the step 802, a write operation may be received at the data storage system, where the write operation writes new data to a target logical address. The new data is stored in the cache, marked as WP, and then later destaged from the cache to backend non-volatile physical storage, such as on PDs of the data storage system. From the step 802, control proceeds to the step 804. At the step 804, a determination is made as to whether the write operation writing the new data is overwriting existing or current data that is currently stored at the target logical address. In at least one embodiment, the step 804 may evaluate to no if this is the first write to the target logical address. Other the step 804 may evaluate to yes. If the step 804 evaluates to yes, control proceeds to the step 806 to perform overwrite processing. Additional detail regarding overwrite processing is described above and also in connection with FIG. 9 below. From the step 806 control proceeds to the step 808. If the step 804 evaluates to no, control proceeds to the step 808

At the step 808, the new data is hashed to determine a fingerprint F1 for the new data. Additionally, the step 808 includes determining the owning EDS based on the fingerprint F1. From the step 808, control proceeds to the step 810. At the step 810, a lookup operation is performed using the fingerprint hash table portion of the owning EDS. The fingerprint F1 of the new data is mapped to an index I1 of the fingerprint hash table portion of the owning EDS. The index I1 is associated with a bucket of entries of fingerprints that maps to the index I1. The bucket of entries may be implemented as a list that is searched to locate an entry with a stored fingerprint that matches the fingerprint F1 of the new data. From the step 810, control proceeds to the step 812 where a determination is made as to whether a matching entry for the fingerprint F1 has been located in the fingerprint hash table portion. If a matching entry is located for the fingerprint F1, then the new data is a duplicate of an existing data block currently stored in the BE. Otherwise if no matching entry is located for the fingerprint F1, then the new data is a new unique data block. If the step 812 evaluates to yes, control proceeds to the step 814. At the step 814, the new data is determined as a duplicate of existing data stored at the BE location B1 of the matching entry. Processing may be performed in the step 814 that updates the FE-BE mapping information to map the target logical address to the BE location B1 of the matching entry.

If the step 812 evaluates to no, control proceeds to the step 816. At the step 816, processing is performed to add a new entry E1 in the fingerprint hash table portion of the owning EDS for the new data. The new entry E1 is added to the bucket associated with the index I1. Physical storage is allocated at a new BE location B2 for storing the new data. The new entry E1 in the fingerprint hash table portion is updated to include the fingerprint F1 and the new BE location B2 at which the new data is stored. From the step 816, control proceeds to the step 818.

At the step 818, processing is performed to insert a new entry E2 in the BE location hash table for the new data. A BE location hash value H1 is determined for the new BE location B2. The BE location hash value H1 is mapped to an index I2 of the BE location hash table. The index I2 is associated with a bucket of entries that map to the index I2. The new entry E2 is added to the bucket associated with the index I2. The bucket of entries associated with I2 may be implemented as a list and the new entry E2 is added to the list. The new entry E2 is updated to include the new BE location B2 at which the data is stored. The new entry E2 of the BE location hash table is updated to reference or point to the new entry E1 added to the fingerprint hash table portion for the new data and its fingerprint F1. From the step 818, control proceeds to the step 820. At the step 820, processing may be performed to update the FE-BE mapping information to map the target logical address to the new BE location B2 storing the new data.

Referring to FIG. 9, shown is a second flowchart 900 of processing that may be performed in an embodiment in accordance with the techniques herein. The flowchart 900 includes processing that may be performed in connection with overwrite processing, for example, such as in the step 808 of the FIG. 8.

At the step 902, processing is performed to determine the current BE location B3 at which the current data for the target logical address is stored. From the step 902, control proceeds to the step 904. At the step 904, processing is performed to determine what other logical addresses, if any, reference B3. From the step 904, control proceeds to the step 906. At the step 906, a determine is made as to whether any other logical address references B3. If the step 906 evaluates to yes, control proceeds to the step 908. At the step 908, the existing fingerprint table entry for the current data stored at the target logical address is not deleted. Other processing may be performed in the step 908 such as, for example, decrementing a dedupe reference count denoting the number of logical address references to B3. In this case, since the target logical address's current data is being overwritten with new data, the target logical address will not reference the current data instance stored at the BE location B3.

If the step 906 evaluates to no, control proceeds to the step 910. At the step 910, processing is performed to identify the existing fingerprint hash table entry E3, where E3 includes the fingerprint F for the current data stored at the target logical address and E3 is to be deleted. The processing includes determining a hash value H3 for B3. The hash value H3 is mapped to an index I3 of the BE location hash table. The index I3 is associated with a bucket B3 of entries that map to the index I3. The bucket B3 list of entries is searched for an existing entry E4 having a BE location that matches B3 (denoting the BE location at which the current data of the target logical address is stored). The entry E4 of the BE location hash table points to the existing entry E3 of the fingerprint hash table, where E3 is the entry including the fingerprint F of the current data. From the step 910, control proceeds to the step 912.

At the step 912, processing is performed to delete the entry E3, that includes the fingerprint F of the current data, from the fingerprint hash table. In connection with deleting E3, the owning EDS is determined based on the fingerprint F. The owning EDS is requested to delete the entry E3 from its fingerprint hash table portion. The entry E3 is deleted from the fingerprint hash table portion of the owning EDS. Additionally, the entry E4 of the BE location hash table may be deleted.

It should be noted that in connection with performing an operation that deletes a LUN with multiple LBAs, each LBA of the LUN may be processed as described above such as in connection with FIG. 8 for the target logical address. In particular, processing may include determining the BE location for each LBA of the LUN being deleted and then performing FIG. 8 processing for the BE location in a manner similar to that as described for the BE location B3.

It should be appreciated that while the steps are described herein as being performed serially and in a certain order, one or more these steps or portions thereof, may be performed concurrently and/or in a different order than illustrated and as described herein.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving a write operation that writes first data to a target logical address;
   determining a first fingerprint for the first data;
   querying a fingerprint hash table using the first fingerprint to determine a first matching entry of the fingerprint hash table for the first fingerprint;
   responsive to determining that the fingerprint hash table does not have the first matching entry that matches the first fingerprint, performing first processing including:
      inserting a first entry in the fingerprint hash table, wherein the first entry includes the first fingerprint for the first data and identifies a first storage location at which the first data is stored; and
      inserting a second entry in a backend location hash table, wherein the second entry references the first entry;
   performing second processing that deletes the first entry from the fingerprint hash table, wherein the second processing includes:
      receiving the first storage location; determining a first hash value for the first storage location;

mapping the first hash value to a corresponding index of the backend location hash table;

querying the backend location hash table to determine a second matching entry of the backend location hash table, wherein the second matching entry is associated with the corresponding index and has an associated backend location matching the first storage location, wherein said querying the backend location hash table returns the second entry in the backend location hash table as the second matching entry; and deleting the first entry of the fingerprint hash table using the second entry.

2. The method of claim 1, wherein the fingerprint hash table is distributed among a plurality of components, wherein the fingerprint hash table includes a plurality of portions of hash table entries, and wherein each of the plurality of components manages a different one of the plurality of portions of the hash table entries.

3. The method of claim 2, wherein the first entry of the fingerprint hash table is included a first of the plurality of portions of hash table entries, wherein the first portion is managed by a first of the plurality of components, and wherein deleting the first entry includes:

referencing the first entry using the second entry;

obtaining the first fingerprint from the first entry that is referenced using the second entry;

determining, in accordance with the first fingerprint, that the first component manages the first entry including the first fingerprint; and communicating with the first component that manages the first entry to delete the first entry from the first portion of hash table entries.

4. The method of claim 1, wherein after receiving the first write operation and performing the first processing, the method further comprises: receiving a second write operation that writes second data to the target logical address, wherein the second data of the write operation overwrites the first data currently stored at the target logical address, and wherein the second processing that deletes the first entry from the fingerprint hash table is included in overwrite processing performed responsive to receiving the second write operation that writes overwrites the first data currently stored at the target logical address.

5. The method of claim 1, wherein the target logical address denotes a first logical address on a logical device that includes a plurality of logical addresses, wherein the plurality of logical addresses includes the first logical address, and the method further comprises: performing processing to delete the logical device, and wherein the second processing that deletes the first entry from the fingerprint hash table is included in the processing that deletes the logical device.

6. The method of claim 1, wherein said querying the fingerprint hash table using the first fingerprint to determine the first matching entry of the fingerprint hash table for the first fingerprint further includes:

comparing the first fingerprint to an associated fingerprint of one entry of the fingerprint hash table;

determining whether the first fingerprint and the associated fingerprint match; and responsive to determining the associated fingerprint matches the first fingerprint, determining that the corresponding entry is the first matching entry and that the first data is a duplicate of existing data used to generate the associated fingerprint.

7. The method of claim 1, wherein the second entry includes an address of the first entry.

8. The method of claim 1, wherein the first storage location identifies a backend location on physical storage at which the first data is stored.

9. The method of claim 1, further comprising:

performing deduplication processing, and wherein said deduplication processing includes performing said determining, said querying, and said first processing.

10. The method of claim 9, further comprising:

storing the first data in a cache; and destaging the first data from the cache to physical storage, said destaging includes performing said deduplication processing.

11. The method of claim 1, wherein the method is performed in a data storage system, wherein the write operation is received at the data storage system from a host that is external to the data storage system, and wherein the method further includes:

responsive to determining that the fingerprint hash table does have the first matching entry that matches the first fingerprint, performing other processing to store the first data of the target logical address as a duplicate of existing data currently associated with the first matching entry, the other processing including:

updating mapping information to map the target logical address to a current storage location at which the existing data is stored.

12. The method of claim 1, wherein said determining the first fingerprint for the first data includes:

determining a corresponding hash value for the first data using a hash function.

13. The method of claim 12, wherein the first fingerprint is a truncated form of the corresponding hash value of the first data.

14. The method of claim 12, wherein the corresponding hash value for the first data is mapped to a first index of the fingerprint hash table, wherein the first matching entry is associated with the first index.

15. The method of claim 14, wherein the first matching entry is included on a list of entries in which each entry of the list includes a different fingerprint that maps to the first index.

16. A system comprising:

one or more processors; and one or more memories comprising code stored thereon that, when executed, performs a method of processing I/O operations comprising:

receiving a write operation that writes first data to a target logical address;

determining a first fingerprint for the first data;

querying a fingerprint hash table using the first fingerprint to determine a first matching entry of the fingerprint hash table for the first fingerprint;

responsive to determining that the fingerprint hash table does not have the first matching entry that matches the first fingerprint, performing first processing including:

inserting a first entry in the fingerprint hash table, wherein the first entry includes the first fingerprint for the first data and identifies a first storage location at which the first data is stored; and inserting a second entry in a backend location hash table, wherein the second entry references the first entry;

performing second processing that deletes the first entry from the fingerprint hash table, wherein the second processing includes:

receiving the first storage location; determining a first hash value for the first storage location;

mapping the first hash value to a corresponding index of the backend location hash table;

querying the backend location hash table to determine a second matching entry of the backend location hash table, wherein the second matching entry is associated with the corresponding index and has an associated backend location matching the first storage location, wherein said querying the backend location hash table returns the second entry in the backend location hash table as the second matching entry; and deleting the first entry of the fingerprint hash table using the second entry.

17. A non-transitory computer readable medium comprising code stored thereon that, when executed, performs a method of processing I/O operations comprising:

receiving a write operation that writes first data to a target logical address;

determining a first fingerprint for the first data;

querying a fingerprint hash table using the first fingerprint to determine a first matching entry of the fingerprint hash table for the first fingerprint;

responsive to determining that the fingerprint hash table does not have the first matching entry that matches the first fingerprint, performing first processing including:

inserting a first entry in the fingerprint hash table, wherein the first entry includes the first fingerprint for the first data and identifies a first storage location at which the first data is stored; and inserting a second entry in a backend location hash table, wherein the second entry references the first entry;

performing second processing that deletes the first entry from the fingerprint hash table, wherein the second processing includes:

receiving the first storage location; determining a first hash value for the first storage location;

mapping the first hash value to a corresponding index of the backend location hash table;

querying the backend location hash table to determine a second matching entry of the backend location hash table, wherein the second matching entry is associated with the corresponding index and has an associated backend location matching the first storage location, wherein said querying the backend location hash table returns the second entry in the backend location hash table as the second matching entry; and deleting the first entry of the fingerprint hash table using the second entry.

* * * * *